US010783270B2

(12) United States Patent
Ithal et al.

(10) Patent No.: US 10,783,270 B2
(45) Date of Patent: Sep. 22, 2020

(54) METHODS AND SYSTEMS FOR SECURING AND RETRIEVING SENSITIVE DATA USING INDEXABLE DATABASES

(71) Applicant: Netskope, Inc., Santa Clara, CA (US)

(72) Inventors: Ravi Ithal, Los Altos, CA (US); Shaila Vasudev, Saratoga, CA (US); Khurram Saqlain, Fremont, CA (US); Mahesh Gupta, San Jose, CA (US); Karan Mendiratta, San Jose, CA (US); Krishna Narayanaswamy, Saratoga, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 16/556,168

(22) Filed: Aug. 29, 2019

(65) Prior Publication Data
US 2020/0076578 A1    Mar. 5, 2020

Related U.S. Application Data

(60) Provisional application No. 62/725,244, filed on Aug. 30, 2018.

(51) Int. Cl.
*G06F 21/62*    (2013.01)
*H04L 9/06*    (2006.01)
(Continued)

(52) U.S. Cl.
CPC ...... *G06F 21/6227* (2013.01); *G06F 16/2255* (2019.01); *G06F 16/245* (2019.01);
(Continued)

(58) Field of Classification Search
CPC .. G06F 16/2255; G06F 16/245; G06F 21/602; G06F 21/6218–6281; H04L 9/0643; H04L 9/0825; H04L 63/0272
See application file for complete search history.

(56) References Cited

U.S. PATENT DOCUMENTS 1,571,516 A1    2/2017    Curcio et al.
2002/0194209 A1*    12/2002    Bolosky ............... G06F 16/137
(Continued)

FOREIGN PATENT DOCUMENTS

WO    WO-2008030717 A1    3/2008
WO    WO-2008041810 A1    4/2008
(Continued)

OTHER PUBLICATIONS

Hashim, Amal. "ResearchGate". <https://www.researchgate.net/post/can_anyone_tell_me_a_novel_approach_used_for_searching_encrypted_data_stored_in_cloud_computing>. Question Asked Apr. 20, 2016. (Year: 2016).*
(Continued)

*Primary Examiner* — Kevin Bechtel
(74) *Attorney, Agent, or Firm* — Haynes Beffel & Wolfeld, LLP; Ernest J. Beffel, Jr.

(57) ABSTRACT

The technology disclosed teaches protecting sensitive data in the cloud via indexable databases. The method includes identifying sensitive fields of metadata for encryption and for hashing. The method also includes hashing at least partial values in the indexable sensitive fields to non-reversible hash values, concatenating the non-reversible hash values with the metadata for the network events, and encrypting the sensitive fields of metadata. Also included is sending the metadata for the network events, with the non-reversible hash values and the encrypted sensitive fields, to a remote database server that does not have a decryption key for the encrypted sensitive fields and that indexes the non-reversible hash values for indexed retrieval against the indexable sensitive fields. The disclosed technology also teaches retrieving sensitive information that is secured at rest: receiving a sensitive field query, hashing the (Continued)

query, querying and receiving network event metadata responsive to the query, and decrypting the metadata.

20 Claims, 10 Drawing Sheets

(51) Int. Cl.
  *G06F 16/22* (2019.01)
  *G06F 16/245* (2019.01)
  *H04L 29/06* (2006.01)
  *H04L 9/08* (2006.01)
  *G06F 21/60* (2013.01)
(52) U.S. Cl.
  CPC ........ *G06F 21/602* (2013.01); *G06F 21/6218* (2013.01); *H04L 9/0643* (2013.01); *H04L 9/0825* (2013.01); *H04L 63/0272* (2013.01)

(56) References Cited

U.S. PATENT DOCUMENTS

| | | | | |
|---|---|---|---|---|
| 2006/0005012 A1* | 1/2006 | Deshpande | ............ | H04L 63/10 713/160 |
| 2009/0214044 A1* | 8/2009 | Kinoshita | ............. | H04L 9/0822 380/283 |
| 2014/0052999 A1* | 2/2014 | Aissi | ......................... | H04L 9/08 713/189 |
| 2019/0166102 A1* | 5/2019 | Chizi | ................. | G06F 21/6245 |

FOREIGN PATENT DOCUMENTS

| | | |
|---|---|---|
| WO | WO-2010076130 A1 | 7/2010 |
| WO | WO-2015002875 A1 | 1/2015 |

OTHER PUBLICATIONS

Gentry, "A Fully Homomorphic Encryption Scheme", a Dissertation submitted to the Department of Computer Science and the Committee on Graduate Studies of Stanford University in partial fulfillment of the requirements for the degree of Doctor of Philosophy, Craig Gentry, Sep. 2009, 209 pages.
Cheng et al., "Cloud Security for Dummies, Netskope Special Edition," John Wiley & Sons, Inc. 2015.
"Netskope Introspection," netSkope, Inc., 2015, 3 pgs.
"Data Loss Prevention and Monitoring in the Cloud" by netSkope, Inc., Nov. 2014, 18 pgs.
"The 5 Steps to Cloud Confidence," netSkope, Inc., 2014, 11 pgs.
"Netskope Active Cloud DLP," netSkope, Inc., 2015, 4 pgs.
"Repave the Cloud-Data Breach Collision Course," netSkope, Inc., 2014, 6 pgs.
"Netskope Cloud Confidence Index™," netSkope, Inc., 2015, 2 pgs.
Griffin et al., "Oasis Key Management Interoperability Protocol Use Cases Version 1.2", Working Draft 01, Copyright Oasis Open 2013, Mar. 18, 2013, 132 pages.
Baron et al, "AWS Certified Solutions Architect Official Study Guide", 2017, 517 pages.

* cited by examiner

```
"id":"000039",
"srcip":"38.104.138.246",
"src_location":"Palo Alto",
"src_region":"CA",
"src_country":"US",
"src_zipcode":"94301",
"src_latitude":38.441898,
"src_longitude":-122.142998,
"dstip":"96.43.148.88",
"dst_location":"San Francisco",
"dst_region":"CA",
"dst_country":"US",
"dst_zipcode":"94105",
"dst_latitude":38.889899,
"dst_longitude":-122.394203,
"user":"test5@client.skopeit.com",
"app":"salesforce",
"activity":"UPLOAD",
"org":"client.skopeit.com",
"numbytes":1856,
"timestamp":1361848934,
"url":"na11.salesforce.com/umpsinternal/session/status"
```

METHODS AND SYSTEMS FOR SECURING AND RETRIEVING SENSITIVE DATA USING INDEXABLE DATABASES

PRIORITY DATA

This application claims the benefit of U.S. Provisional Patent Application No. 62/725,244, entitled, "METHOD AND SYSTEMS FOR SECURING AND RETRIEVING SENSITIVE DATA USING INDEXABLE DATABASES", filed on Aug. 30, 2018. The provisional application is incorporated by reference for all purposes.

INCORPORATIONS

The following materials are incorporated by reference in this filing: "Cloud Security for Dummies, Netskope Special Edition" by Cheng, Ithal, Narayanaswamy, and Malmskog, John Wiley & Sons, Inc. 2015; "Netskope Introspection" by Netskope, Inc.; and U.S. Non Provisional application Ser. No. 14/198,508, entitled "Security For Network Delivered Services", filed Mar. 5, 2014 (now U.S. Pat. No. 9,270,765, issued Feb. 23, 2016).

The following materials are also incorporated by reference: "Data Loss Prevention and Monitoring in the Cloud" by Netskope, Inc.; "The 5 Steps to Cloud Confidence" by Netskope, Inc.; "Netskope Active Cloud DLP" by Netskope, Inc.; "Repave the Cloud-Data Breach Collision Course" by Netskope, Inc.; and "Netskope Cloud Confidence Index™" by Netskope, Inc.

FIELD OF THE TECHNOLOGY DISCLOSED

The technology disclosed generally relates to building indexable databases with sensitive data secured at rest and retrieving sensitive information that is secured at rest for providing customer data privacy protection (CDPP) with visibility, control and data security for network delivered services, and more particularly relates to protecting personally identifiable information (PII) stored in the cloud, for security and regulatory compliance.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The use of cloud services for corporate functions is common. Enterprise companies often utilize software as a service (SaaS) solutions instead of installing servers within a corporate network to deliver services and information technology (IT) and network architecture approaches that log and protect access on the corporate network provide limited control. Additionally, the sprawl of "bring your own devices" (BYODs) and the need to haul that traffic back to the enterprise impact network-based security protections. For example, VPN solutions are often used to control access to the protected corporate network. Proxies, both transparent and explicit, may be used to filter or limit access to undesirable web sites when the client is accessing the web sites from within the corporate network. Similar filtering software can be installed on client computers, e.g. safe browsing software, to enforce limits on access. A viable security solution provides consistent, centrally administered control, enforcing the same protection policy across multiple devices, network services, and networks—including corporate networks.

Data is the lifeblood of many businesses and must be effectively managed and protected to meet compliance requirements. Protecting data in the past was focused primarily for on premise scenarios, but with the increased adoption of cloud services, companies of all sizes are relying on the cloud to create, edit and store data. This presents new challenges as users access cloud services from multiple devices and share data, including with people outside of an organization. It is easy for data to get out of an organization's control.

As the number of cloud services increases exponentially, there are hundreds of ways data can leak. Employees might attach a wrong file while sending e-mails, hit the send button too early, not be careful when rushing to a deadline, or share data and collaborate with people outside of their organization. Native cloud storage sync clients also pose a significant risk to organizations, as a continuous sync takes place between the end point and the cloud service without employees realizing they are leaking confidential company information. Additionally, cloud services are making it possible for disgruntled workers to steal intellectual property.

Sharing content from the cloud has never been easier. The challenge is the risk that sensitive data could get into the wrong hands. For example, when logs that contain sensitive data such as customers' personally identifiable information (PII), non-public financials, strategic plans and customer lists are stored in the cloud, the data needs to be protected. When the protected data is retrieved from the cloud and decrypted, a potentially risky situation ensues. The encryption key used to encrypt data needs to be protected against insider threat that could compromise the sensitive data in the cloud.

An opportunity arises to mitigate the risk of data loss by protecting sensitive data stored in the cloud by extending customer data privacy protection capability to protect sensitive data stored in the cloud and retrieved from the cloud for on premises use.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 7 shows exemplary metadata for a network event that includes sensitive data to be securely stored in a cloud service.

DETAILED DESCRIPTION

Figure 1:
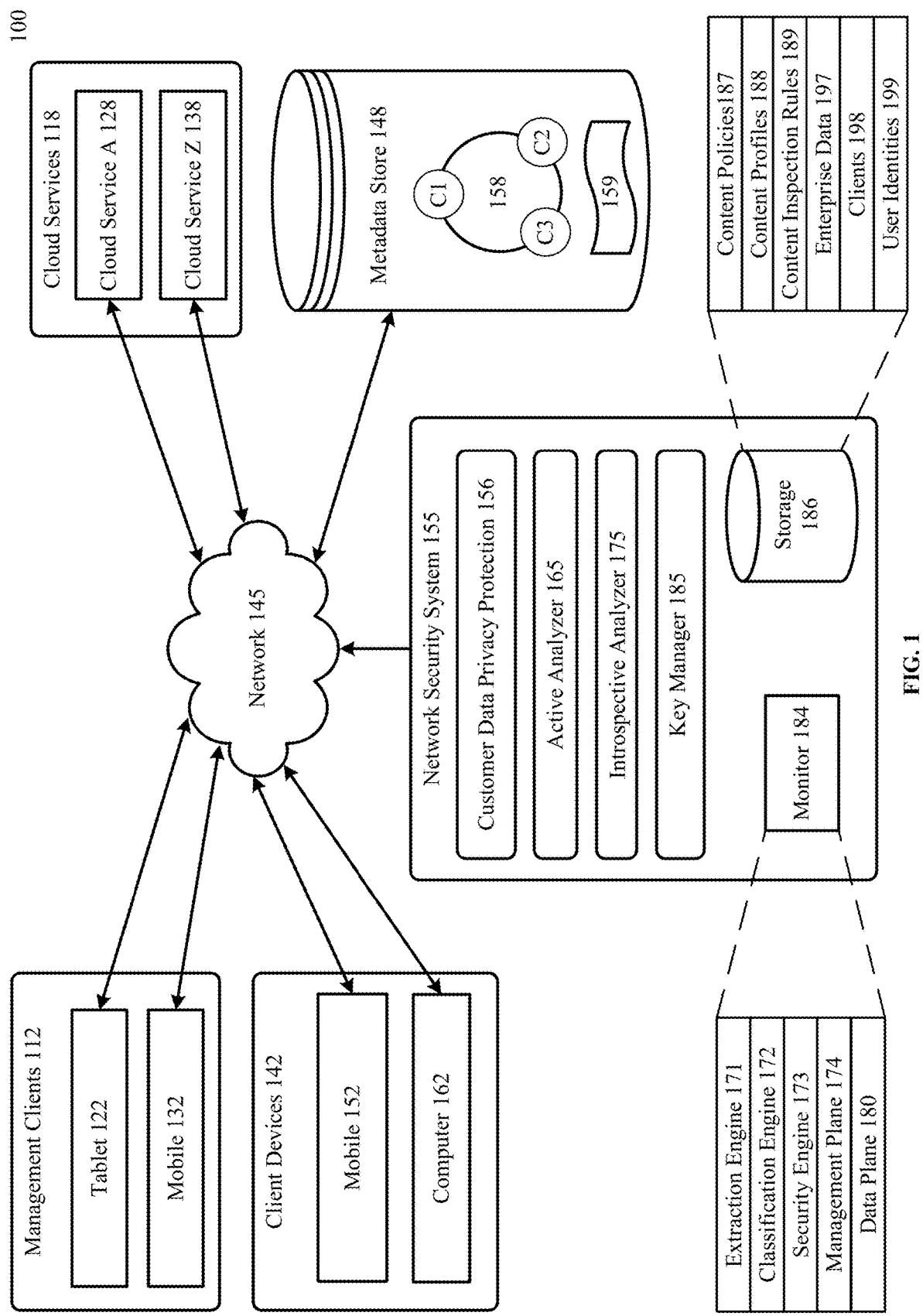
FIG. 1 illustrates an architectural level schematic of a system for providing security for network delivered services.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Customers with strict data-privacy controls require that the personally identifiable information (PII) of their users be encrypted before it is stored in the cloud. That is, customers require that data security solutions address privacy concerns of users, including the General Data Protection Regulation (GDPR) on data protection and privacy for individuals within the European Union (EU) and the European Economic Area (EEA), which also addresses the export of personal data outside the EU and EEA areas.

Consider the technical problem of protecting users' personally identifiable data, which can include personally identifiable information (PII), payment card information and electronic personal health information. Even when customers have the ability to configure, from their tenant user interface (UT), certain fields in their network traffic metadata to be encrypted before being sent to the cloud for storage using an existing data security solution, when fields that contain encrypted sensitive data are retrieved from the cloud and decrypted, a potentially risky situation ensues. In one example, the encryption key used to encrypt data needs to be protected against insider threat that could compromise the sensitive data in the cloud. In one case, a disgruntled worker who has access to the encryption keys could steal intellectual property. An encryption key, as used herein, refers to a code or number which, when taken together with an encryption algorithm, defines a unique transformation used to encrypt or decrypt data.

The technology disclosed solves the technical problem of protecting encrypted sensitive data stored in the cloud that could otherwise get into the wrong hands. The disclosed technical solution includes methods and systems for building indexable databases with sensitive information secured at rest, to provide data security for sensitive data stored in the cloud. The disclosed technology extends customer data privacy protection (CDPP) capability for the use case in which the data plane point of presence (POP) is on premises for an enterprise. The disclosed solution allows organizations to use cloud services available in the market and selectively authorize sensitive data for protection when stored in the cloud, to make the use of those services acceptable to the organizations from a security and compliance standpoint. For the disclosed technology, on premises extends to include virtual private networks controlled by the customer. As used herein, a virtual private network extends a private network across a public network, and enables users to send and receive data across shared or public networks as if their computing devices were directly connected to the private network.

Sensitive data secured in the cloud using encryption utilizes an encryption key provided on the customer's premises. The on premises system includes a hardware security module (HSM) that generates the key used to encrypt the sensitive data, in one implementation. An encryption key algorithm can be used to generate encryption keys in another implementation. In some cases, the algorithms for producing the encryption keys can be slow relative to the speed of retrieving keys from a hardware security module (HSM) and relative to the demands of modern enterprise platforms' needs. Given customer premises encryption and decryption, symmetric encryption is practical. In another implementation of the disclosed technology the client could have access to a pair of keys and could use both a private key and a public key, with asymmetric encryption. This approach can be more expensive so not as performant.

To minimize exposure to data loss, it is desirable to rotate the encryption key on a regular basis, which is definable in terms of quantity of data processed. In one use case, the encryption key is rotated after each 100 MB of data is encrypted, so many keys are used to encrypt large quantities of data over time, for the sensitive data stored in the cloud. The encryption key can be rotated after 100 MB to 1 GB or 100 MB to 100 GB or 10 GB to 1 TB, depending on volume and sensitivity of data. The rotation of keys makes the technology disclosed particularly useful, but no rotation is needed to make this technology useful and beneficial. To retrieve the sensitive information encrypted and stored in the cloud, the key used for encrypting the sensitive data must be used to decrypt the encrypted data. This key is only available to the customer on the customer's premises, not in the cloud and not accessible to the security platform provider. In some use cases, encryption key rotation can occur on a regular basis, such as once every 24 hours, to reduce the period of access in the case of a security compromise.

Search and retrieval of stored sensitive data cannot be readily accomplished using a regular query when multiple different encryption keys have been used to store instances of the data that is to be retrieved. The disclosed technology includes a solution for retrieving the sensitive information that is secured at rest. The disclosed technology teaches hashing the sensitive data before storing it in the cloud, as a signature, to enable exact match querying of the encrypted sensitive data stored in the cloud. Then, when a query is made, the query is hashed and compared to the hashed data stored in the cloud. Retrieval of data in response to a query requires an exact match between the hashed stored data and the hashed query data. Note that, unlike the ability to decrypt an encrypted field when the correct key is available, hashes are non-reversible.

In particular, the technology disclosed provides a safe cloud adoption option for customers and businesses by protecting data in a fine-grained context. Unlike solutions for which encryption for the cloud services is an all-or-nothing proposition; the technology disclosed allows companies to narrow the aperture of data that needs protection so that they can target the real risks in their organizations without having to necessarily encrypt everything.

In addition to having fine-grained contextual controls, a company can also enable encryption for content that matches the organization's data loss prevention (DLP) profile, including personally-identifiable information, electronic personal health information, payment card information, profanity, and even custom regular expressions defined by the organization. In one implementation, the technology disclosed uses AES 256-bit encryption for the sensitive enterprise data being uploaded to, or downloaded from cloud services.

The disclosed technology can allow organizations to encrypt sensitive data as it is being uploaded. The following is a sample list of some of the encryption-related use cases that can be implemented using the technology disclosed:
  A bio-pharmaceutical company can enforce a policy that says any file containing electronic personal health information should be encrypted upon upload to any data and analysis cloud service.
  An investment bank can enforce a policy that says any existing folder in a cloud service containing mergers and acquisitions (M&A) data based on the bank's custom regular expression profile should be encrypted, and can only be shared within a collaboration group.
  An insurance company can enforce a policy that says any file being uploaded by an insurance adjuster from a mobile device into a cloud storage service should be encrypted.

Examples of systems, apparatus, and methods according to the disclosed implementations are described in an information technology context. In other instances, the technology disclosed can be applied to fraud detection, telecommunications systems, financial systems, security trading, banking, business intelligence, marketing, mining, energy, etc. Other services are possible, such that the following examples should not be taken as definitive or limiting either in scope, context, or setting.

The technology disclosed relates to building indexable databases with sensitive information secured at rest, and can be implemented in the context of any computer-implemented system including an on-demand database system, a multi-tenant environment, or the like. An example system for providing security for network delivered services is described next.

System

FIG. 1 shows an architectural level schematic of a system 100 for providing security for network delivered services. System 100 includes network security system 155, management clients 112, cloud services 118, client devices 142 and public network 145. Network security system 155 includes customer data privacy protection 156, active analyzer 165, introspective analyzer 175, key manager 185, monitor 184 and storage 186. Monitor 184 of network security system 155 includes extraction engine 171, classification engine 172, security engine 173, management plane 174 and data plane 180. Management clients 112 include tablet 122 and mobile 132, cloud services 118 includes cloud service A 128 through cloud service Z 138, and client devices 142 include mobile 152 and computer 162. Storage 186 includes content policies 187, content profiles 188, content inspection rules 189, enterprise data 197, information for clients 198 and user identities 199. User identity refers to an indicator that is provided by the network security system to the client device, in the form of a token, a unique identifier such as a UUID, a public-key certificate, or the like. In some implementations, the user identity can be linked to a specific user and a specific device; thus, the same individual can have a different user identity on their mobile phone vs. their computer. The user identity can be linked to an entry or userid corporate identity directory, but is distinct from it. In one implementation, a cryptographic certificate signed by the network security is used as the user identity. In other implementations, the user identity can be solely unique to the user and be identical across devices.

Continuing with the description of system 100, in some implementations, storage 186 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

Enterprise data 197 can include organizational data, including but not limited to, intellectual property, non-public financials, strategic plans, customer lists, personally identifiable information (PII) belonging to customers or employees, patient health data, source code, trade secrets, booking information, partner contracts, corporate plans, merger and acquisition documents and other confidential data. In particular, the term "enterprise data" refers to a document, a file, a folder, a webpage, a collection of webpages, an image, or any other text-based document. Key manager 185 includes a dedicated crypto processor, described later in this document in detail. In some implementations, a non-hardware based crypto processor can be utilized.

In the interconnection of the elements of system 100, network 145 couples management client tablet 122 and mobile 132, client device mobile 152 and computer 162, cloud service A 128 through cloud service Z 138, and network security system 155 in communication. The communication path can be point-to-point over public and/or private networks. Communication can occur over a variety of networks, e.g. private networks, VPN, MPLS circuit, or Internet, and can use appropriate application program interfaces (APIs) and data interchange formats, e.g. REST, JSON, XML, SOAP and/or JMS. All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Further continuing with the description of the system architecture in FIG. 1, network security system 155 includes monitor 184 and storage 186 which can include one or more computers and computer systems coupled in communication with one another. They can also be one or more virtual computing and/or storage resources. For example, monitor 184 can be one or more Amazon EC2 instances and storage 186 can be Amazon S3™ storage. Other computing-as-service platforms such as Rackspace, Heroku or Force.com from Salesforce could be used rather than implementing network security system 155 on direct physical computers or traditional virtual machines. Additionally, one or more engines can be used and one or more points of presence (POPs) can be established to implement the security functions. The engines can be of varying types including a workstation, server, computing cluster, blade server, server farm, or any other data processing system or computing device. The engine can be communicably coupled to the databases via a different network connection. For example, extraction engine 171 can be coupled via network(s) 145 (e.g., the Internet), classification engine 172 can be coupled via a direct network link and security engine 173 can be coupled by yet a different network connection. For the disclosed technology, the data plane 180 POPs is hosted on the client's premises or located in a virtual private network controlled by the client.

Figure 2:
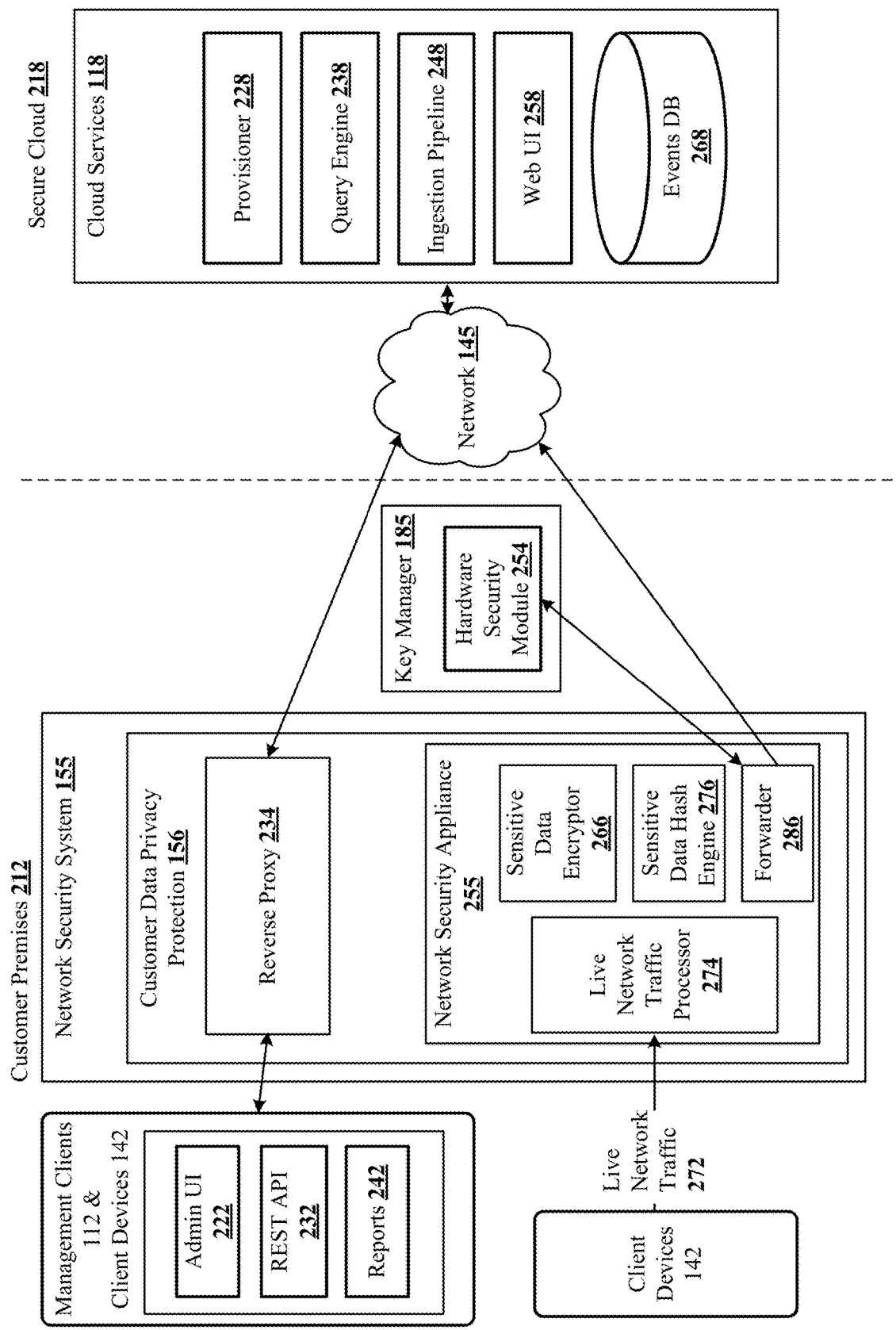
FIG. 2 shows a block diagram for an on premises network security system coupled with secure cloud services, in a system for building indexable databases with sensitive information secured at rest and for retrieving the secured sensitive information.

Continuing the description of FIG. 1, system 100 includes network security system 155 with customer data privacy protection 156 which is described in detail relative to FIG. 2. Network security appliance 255 provides a variety of functions via a management plane 174 and a data plane 180. Data plane 180 includes an extraction engine 171, a classification engine 172, and a security engine 173, according to one implementation. Other functionalities, such as a control plane, can also be provided. These functions collectively provide a secure interface between cloud services 118 and client devices 142. Although we use the term "network security system" to describe network security system 155, more generally the system provides application visibility and control functions as well as security. In one example, thirty-five thousand cloud applications are resident in libraries that intersect with servers in use by client devices 142.

The management clients 112 are computing devices with a web browser with a secure web-delivered interface provided by network security system 155 to define and administer content policies 187, according to one implementation. Network security system 155 is a multi-tenant system, so a user of a management client can only change content policies 187 associated with their organization, according to some implementations. In some implementations, APIs can be provided for programmatically defining and or updating policies. In such implementations, management clients 112 can include one or more servers, e.g. a corporate identities directory such as a Microsoft Active Directory, pushing updates, and/or responding to pull requests for updates to the content policies 187. Both systems can coexist; for example, some companies may use a corporate identities directory to automate identification of users within the organization while using a web interface for tailoring policies to their needs. Management clients are assigned roles and access to the network security system 155 data is controlled based on roles, e.g. read-only vs. read-write.

A control plane may be used along with or instead of management plane 174 and data plane 180. The specific division of functionality between these groups is an implementation choice. Similarly, the functionality can be highly distributed across a number of points of presence (POPs) to improve locality, performance, and/or security. For the disclosed technology, the data plane is on premises or on a virtual private network and the management plane of the network security system is located in cloud services or with corporate networks, as described herein. For another secure network implementation, the POPs can be distributed differently.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. The technology disclosed can be implemented in the context of any computer-implemented system including a database system or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™ Apache Spark™, Apache Kafka™, Apache Flink™, Truviso™, IBM Info-Sphere™, Borealis™ and Yahoo! S4™.

FIG. 2 is a block diagram that shows customer premises 212 connected via network 145 to secure cloud 218 in a system for building indexable databases with sensitive information secured at rest, and for retrieving the secured sensitive information. FIG. 2 shows details for customer data privacy protection 156 in network security system 155. Reverse proxy 234 establishes an intermediate connection point, positioned on the customer premises 212, for handling queries from management clients 112 and client devices 142 and responses to the queries. Reverse proxy 234 also includes processing encrypted data to deliver decrypted data accessible via an on-premises UI. As used in the disclosed technology and described in this specification, the reverse proxy resides on the customer premises. A reverse proxy may instead reside on a cloud server in a different application environment.

Continuing with the description of the system shown in FIG. 2, management clients can include an admin UI 222 for system administrators, a REST UI 232 and reports 242. The representational state transfer (REST) data interchange format provides interoperability between computer systems on the Internet. In one example use case, reverse proxy 234 enables a customer who already has an event processing aggregation platform to decrypt and transfer data from cloud services 118 events database 268 to their event processing aggregation platform via the REST API. Reverse proxy 234 can also detect encrypted data in reports generated in cloud services 118 and can decrypt and replace the encrypted data with clear text data before forwarding the report to on-premises management clients 112 and client devices 142. We describe reverse proxy 234 in more detail relative to FIG. 3.

Continuing the description of the block diagram in FIG. 2, an on-premises key manager 185 includes hardware security module (HSM) 254 that includes a dedicated crypto processor that is specifically designed for the protection of encryption keys inside a hardened, tamper-resistant device. For some implementations, a non-hardware based encryption key algorithm can be utilized, such as in virtual environments, for use in parts of the world in which the hardware HSM is not available, and for use in small companies. Geopolitical considerations apply to some countries, such as Australia and some EU countries, which restrict trans-border data flow of certain decrypted data, such as personal data, and do not allow secrets that enable decryption of restricted data to leave their country. For those countries, separate certified physical and logical locations implement separate app servers with apps with independent certificates. Separate HSMs can be provided in each geopolitical jurisdiction that restricts trans-border data flow of the decrypted data for each server. In one implementation, a virtual app server can be implemented with apps with independent certificates.

Further continuing with the description of customer data privacy protection 156 in network security system 155, network security appliance 255 accepts live network traffic 272 from client devices 142 and generates event metadata on an ongoing basis. The event metadata includes sensitive data, generated by proxy from the live traffic passing through. Network security appliance 255 includes live network traffic processor 274 that digests live network traffic, generates metadata to represent events, such as login, file uploads and logout, and identifies sensitive data in the metadata that needs to be securely stored in the cloud. Live network traffic processor 274 includes generating metadata that identifies which users are utilizing which cloud apps. Live network traffic that corresponds to a cloud app interaction stimulates creation of an event, which includes user info, including which app is in use, from which IP address the log entry arrives, as well as private information that needs to be secured. The cloud service detection and content-based function or activity identification provided by the network security appliance 255 will be described by focusing on application layer traffic. Network security appliance 255 uses algorithm-based traffic analysis that discovers cloud services interfacing with an organization's network by deep inspecting services transactions in real time, including calls made to the services. The technology disclosed uses connectors or standardized integrations to interpret the transactions between client devices 142 and cloud services 118. The transactions are decomposed to identify the activity being performed and its associated parameters. The transactions are represented as JSON files, which include a structure and format that allow monitor 184 to interpret what actions a user is performing in the cloud service as it is happening. For example, monitor 184 can detect for an organization that "Joe from Investment Banking, currently in Japan, shared his M&A directory with an investor at a hedge fund at 10 PM".

Deep API inspection for a typical user interaction with a cloud service like Salesforce.com includes identifying a sequence of events that occur in the context of a session. Main events of note include: (a) login—provide user credentials to cloud service to authenticate the user; (b) application transactions—execute a set of application level transactions, e.g. upload meeting notes, add leads, or define new campaigns; and (c) log-out—this event terminates the session with the server. In this context an application session connects these interactions for the network security system. Deep API inspection logic can identify these events. Most commonly, the application session is identified by a session cookie in the HTTP header. The network security system 155 can use the session cookie to define the session or alternately use a tuple that includes user id, user IP address, application instance id, device, operating system and browser/native application to define the session.

Further continuing with the description of the block diagram shown in FIG. 2, sensitive data encryptor 266, in network security appliance 255, encrypts the identified sensitive data and sensitive data hash engine 276, also in network security appliance 255, hashes the sensitive data. Forward 286, in network security appliance 255, accesses hardware security module 256, in key manager 185 to obtain an encryption key and utilizes the key to encrypt sensitive data. Forward 286 then sends the event data to cloud services 118 ingestion pipeline 242, which transfers the event metadata with both the encrypted sensitive data from sensitive data encryptor 266 and the hash of the sensitive data from sensitive data hash engine 276 to events database 268 in secure cloud 218. In some implementations, an initialization vector (SALT) can be used with sensitive data hash engine 276 to prevent dictionary attacks against the hashed sensitive data.

Continuing further with the description of the system shown in FIG. 2, secure cloud 218 includes cloud services 118 with web UI 258, which enables administration and reporting via web browsers. Web UI 258 includes feature controls that enable customers to select available fields for encryption of sensitive data. Secure cloud 218 also includes provisioner 228 which provides the appropriate client, such as VPN on demand, to client devices 142 for configuration. Provisioner 228 is responsible for providing content and security policy updates to client devices 142. Provisioner 228 also includes an API with a schema that turns on the feature for encrypting and hashing sensitive data fields. When executed, this backend API will set or unset the CDPP availability flag in the MySQL tenant database, which in turn will generate or update a config file, by calling the configuration pusher API for the tenant. One such example schema for turning on CDPP on premises is listed next.

```
curl -H 'Content-Type: application/json' -d '{
"dpop_piiprivacy_availability": "1" }'
http://provisionervip:6000/client/config?tenantid=<tenant id>
{"piiprivacy" : "0" or "1" }
```

After the privacy feature is turned on for a tenant, they can customize the fields that need to be encrypted for an event payload. Fields that are configurable as sensitive fields include user, source IP address, email, referrer, URL, page and user IP. In a different implementation, other fields can be identified as potentially sensitive fields that require encryption when stored at rest in the cloud. Next we describe the flow of event data for sensitive fields.

Figure 3:
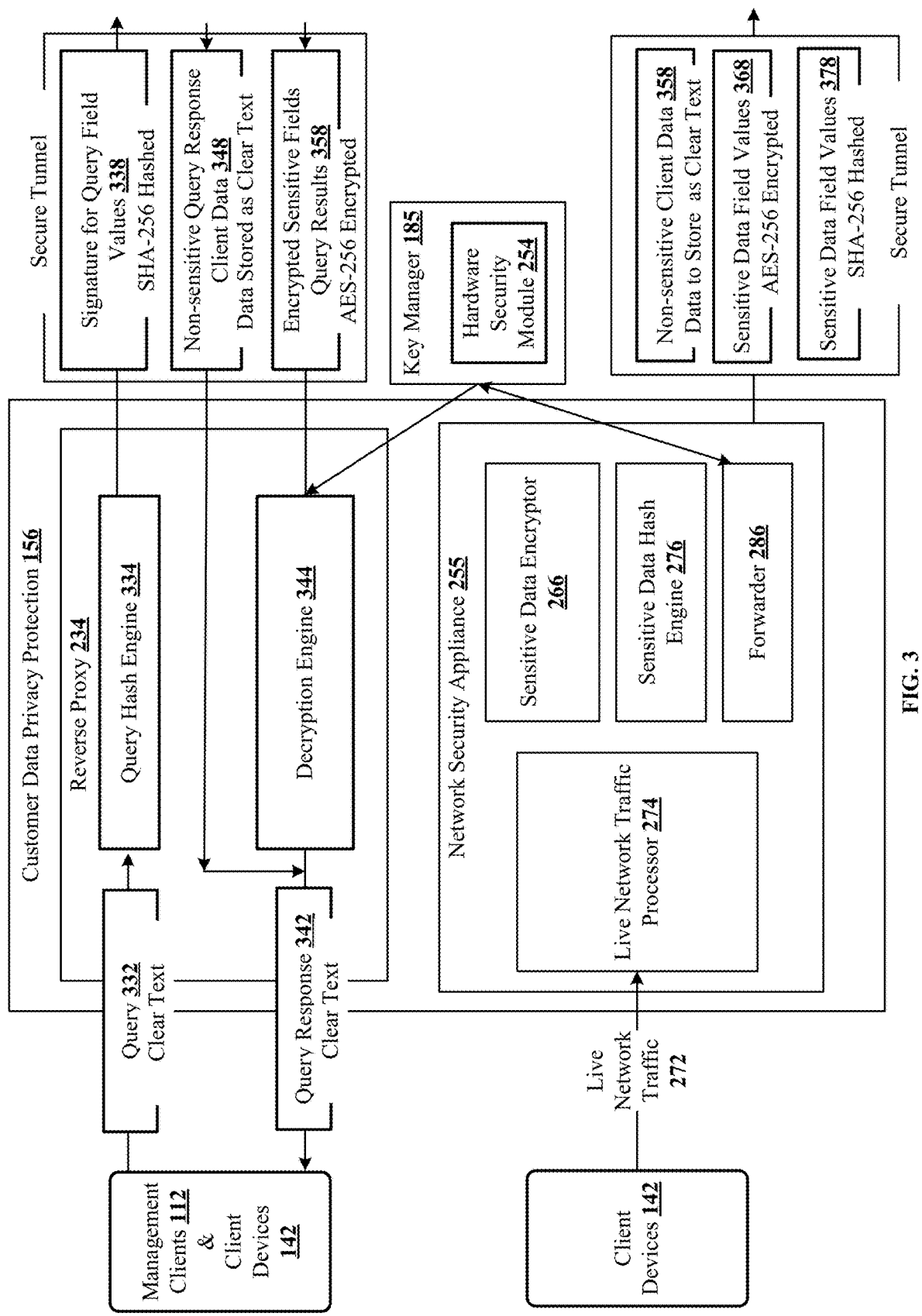
FIG. 3 illustrates the workflow of securing sensitive metadata generated from live data from browser and application traffic, as the data identified as sensitive is encrypted and hashed to be secured at rest in the cloud and decrypted when it is retrieved.

FIG. 3 illustrates the flow of securing sensitive metadata generated from live network traffic from browsers and applications, as the data identified as sensitive is encrypted and hashed to be secured at rest in the cloud and decrypted when it is retrieved. Client devices 142 generate live network traffic 272 that is processed by live network traffic processor 274, which identifies sensitive data to be encrypted and hashed. Traffic arriving at the network security system can have the user identity embedded in the data or within the secure tunnel headers, e.g. additional headers or SSL client side certificates in some embodiments. Live network traffic processor 274 identifies sensitive data that needs to be encrypted when stored in the cloud. Key manager 185 includes hardware security module (HSM) 254 that generates encryption keys: for use in performing encrypting and decrypting operations. A password may be required to access HSM 254. Each app server or cluster in a data center of app servers can have a separate HSM, in one implementation. HSM 254 adheres to the Key Management Interoperability Protocol (KMIP) that defines message formats for the manipulation of cryptographic keys.

Continuing with the description of FIG. 3, sensitive data encryptor 266 requests and receives an encryption key from HSM 254 and utilizes advanced encryption standard (AES)-256 for encrypting identified sensitive data from event log processor 264. Sensitive data encryptor 266 encrypts the identified sensitive data and sensitive data hash engine 276 hashes the same identified sensitive data. Sensitive data hash engine 276 hashes identified sensitive data before storing it in the cloud, to enable querying of the encrypted sensitive data stored in the cloud. The cryptographic hash functions as a signature for the data file for the event. In one implementation, sensitive data hash engine 276 utilizes a SHA-256 cryptographic hash algorithm to generate an almost-unique 256-bit (32-byte) signature for the event data file. In another implementation, data hash engine 276 can utilize a different cryptographic hash algorithm such as SHA-384, SHA-512 or HAVAL 160. Forwarder 286 forwards the event to cloud storage with the signature hash of sensitive data field values 378, non-sensitive client data 358 and encrypted sensitive data field values 368, as well as non-sensitive client data 358 included as part of the event data.

Further continuing with the description of the workflow shown in FIG. 3, when management clients 112 and client devices make a query 332, query hash engine 334 hashes the query to generate the signature for the query. Reverse proxy 234 sends the signature SHA-256 hashed query field values 338 to query engine 238 in cloud services 118. That is, retrieval is handled by assigning pre-encryption hashes to searchable fields to allow exact searches across segments of the database that have different encryption keys. When an exact match occurs between a hashed query and the hashed sensitive data field values 378 stored in the cloud, query results are delivered on premises by query engine 238. Decryption engine 344 decrypts the encrypted sensitive fields query results 358—requesting the encryption key that was used to encrypt the data from key manager 185. Decryption engine 344 uses the retrieved key to decrypt the encrypted sensitive fields, and sends the clear text of the sensitive field values, in combination with the non-sensitive query response client data 348, as query response 342 in clear text. In one use case that utilizes centralized key management, multiple on premises log parsers (OPLP) for an entity need to use the same encryption key. In this use case, encryption keys can be synchronized, via a single HSM and in one example case can be connected to forty OPLP that access the same encryption key. In that case, customer data privacy protection 156 can export keys from one OPLP and import into another OPLP.

Figure 4:
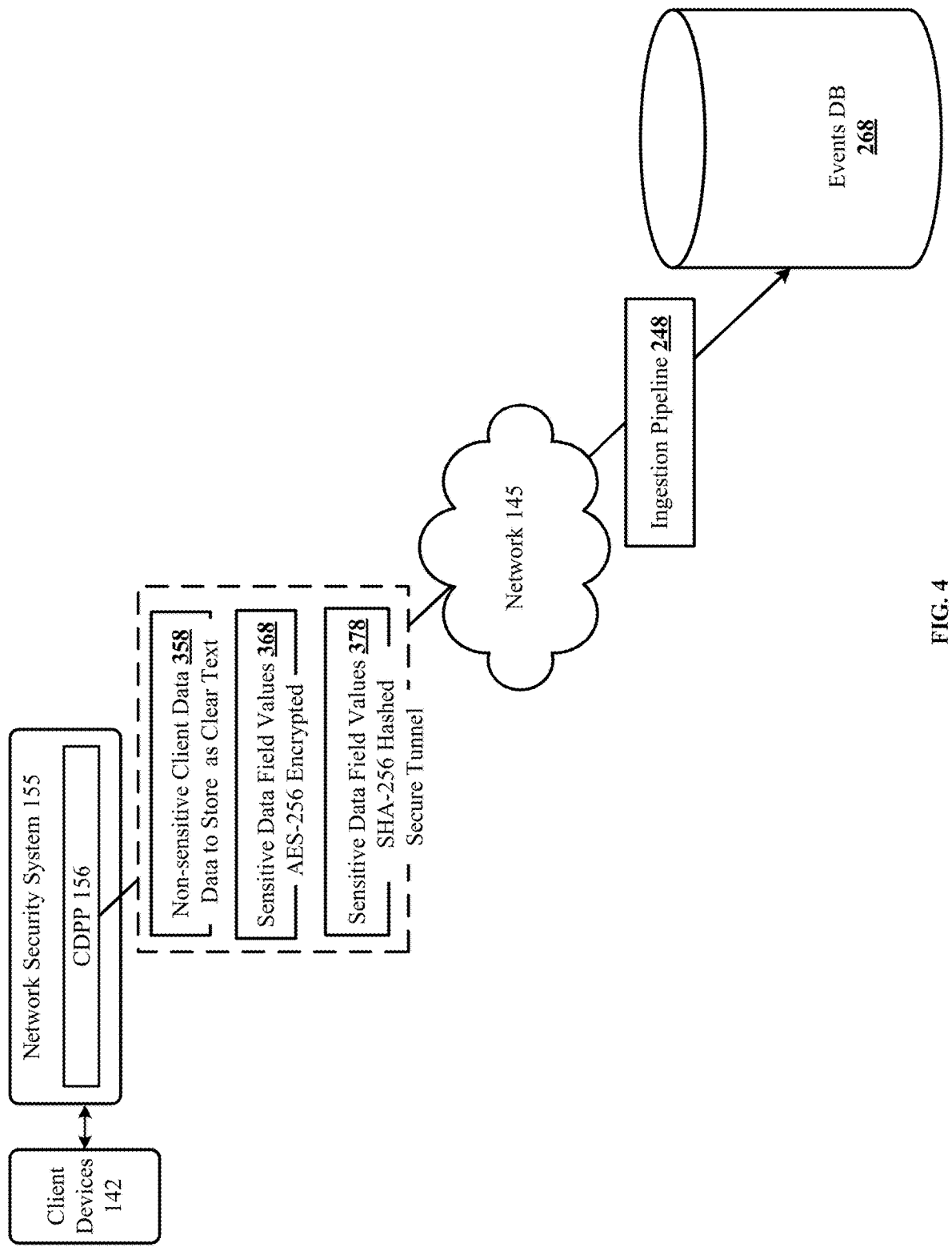
FIG. 4 depicts one implementation of storing sensitive metadata for a network event, by a client data privacy protection platform, in a secure cloud metadata store, with the data traversing the public network via a secure tunnel.

FIG. 4 illustrates an example of transmitting encrypted sensitive data for storage in the cloud. FIG. 4 depicts one implementation of storing sensitive metadata for a network event, by a client data privacy protection platform, in a secure cloud metadata store, with the data traversing the public network via a secure tunnel. Client data protection 156 in network security system 155 forwards encrypted, hashed sensitive information from client devices 142, described relative to FIG. 3, over network 145 to ingestion pipeline 248 that will secure the sensitive data in events database 268. That is, data ingestion pipeline 248 moves data from the on premises system to an independent data store in the cloud, while protecting the sensitive data. An "independent data store" refers to a hosted service or a cloud service or a cloud application or a cloud storage provider or a cloud storage application or a cloud computing service (CCS).

Figure 5:
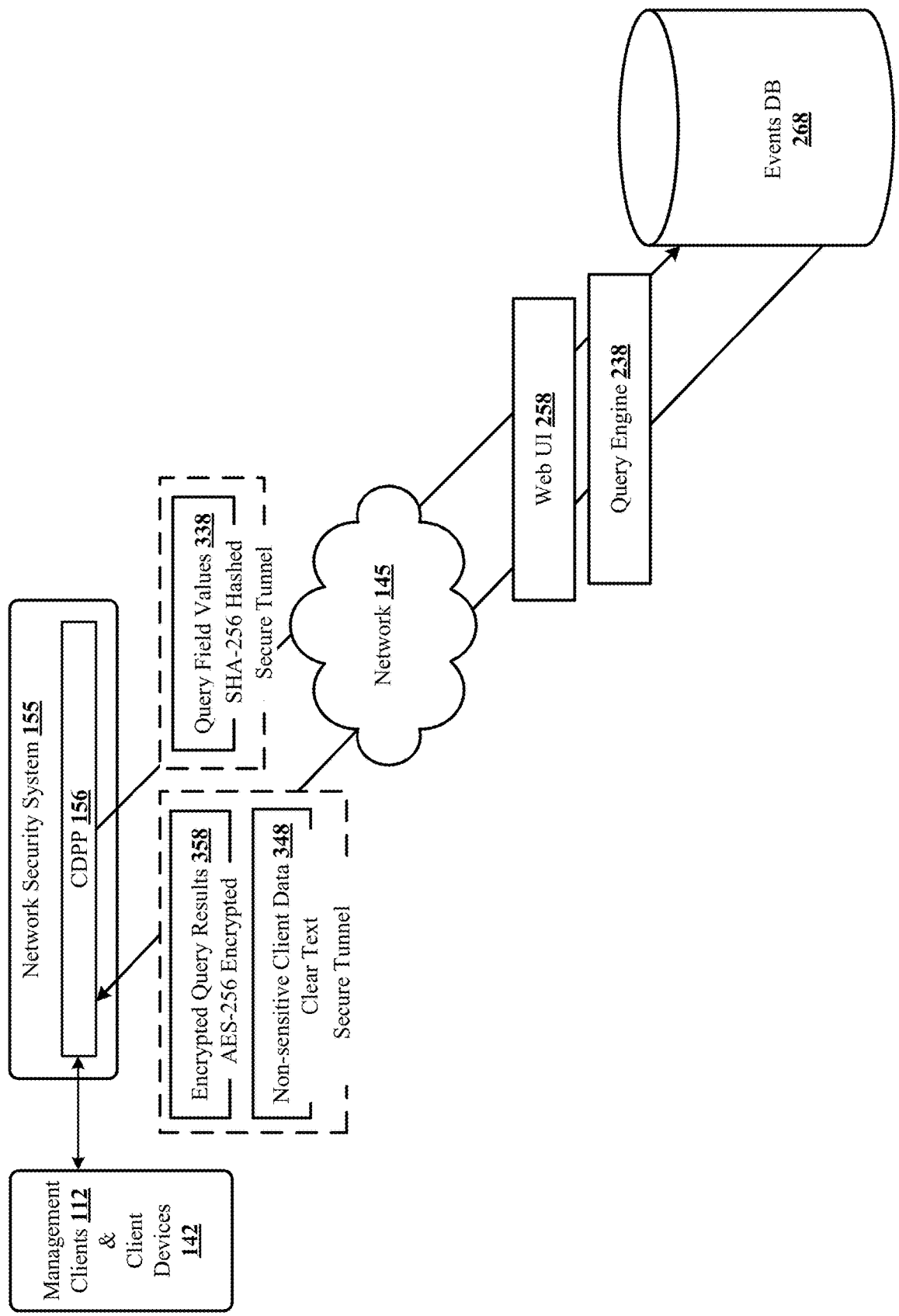
FIG. 5 illustrates an example of transmitting a query for sensitive data to cloud services.

FIG. 5 illustrates an example of transmitting a query for sensitive data to cloud services 118. Reverse proxy 234 in customer data privacy protection 156 in network security system 155 transmits a query from management client 112 or client device 142 as a signature of hashed query field values 338 described relative to FIG. 3, over network 145 to query engine 238. Query engine 238 generates a search for an exact match between transmitted signature hashed query field values 338 and the hashed query field values stored in events database 268. When an exact match occurs between a hashed query and the hashed sensitive data field values 378 stored in the cloud, encrypted query results 358 and non-sensitive client data 348 for the same event are delivered on premises, by query engine 238, via network 145 to reverse proxy 234.

Figure 6:
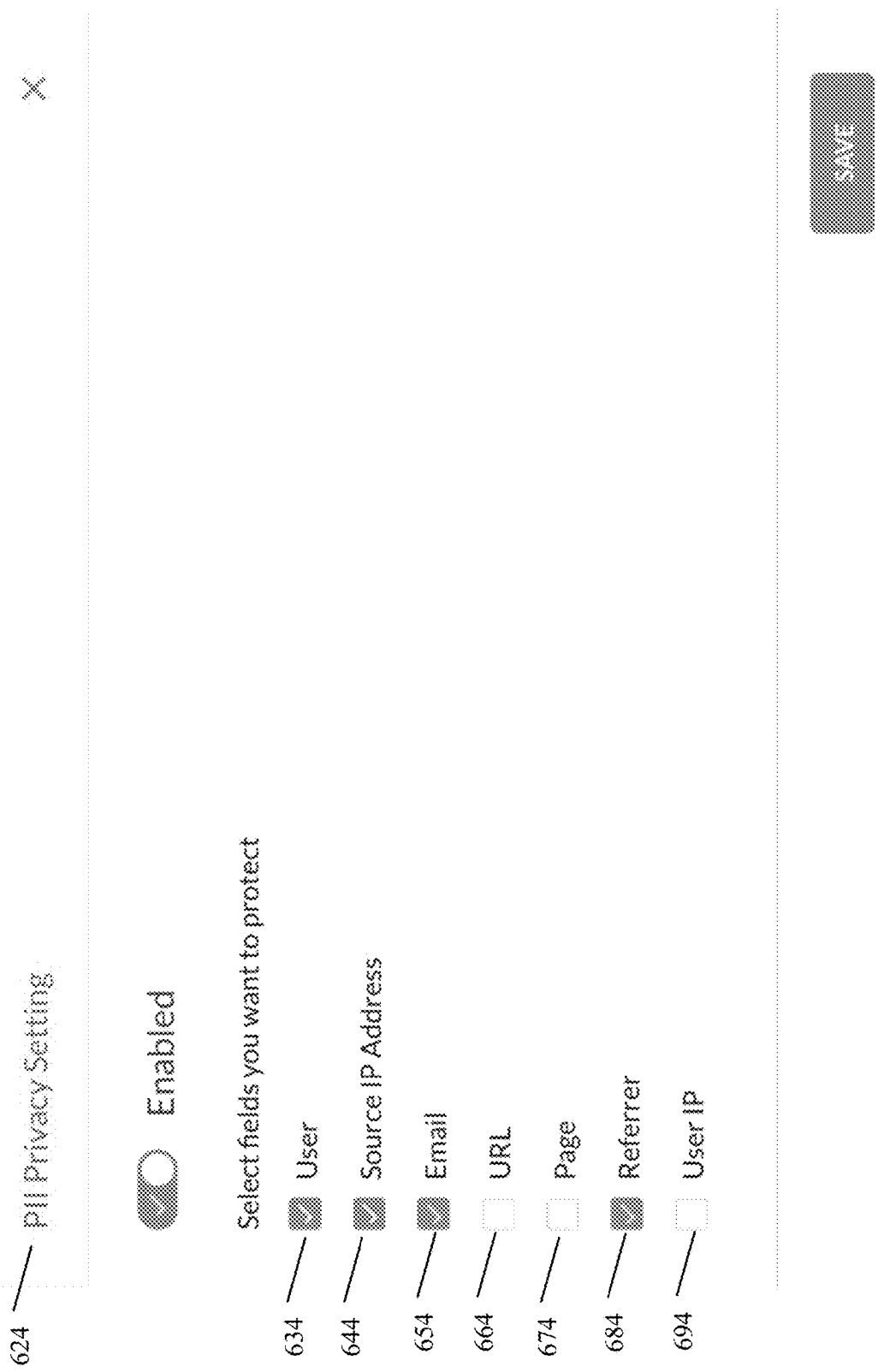
FIG. 6 illustrates one implementation of a dashboard that provides visibility of enterprise information that can be configured in the tenant database as available event fields for encryption, based on privacy configuration and enablement settings for personally identifiable information (PII).

FIG. 6 illustrates one implementation of a dashboard that provides visibility of enterprise information that can be configured in the tenant database as available sensitive data fields for encryption, based on privacy proxy configuration and enablement settings. PII sensitive fields 624 include user 634, source IP address 644, email and referrer 684 are shown in the enable state in FIG. 6. Configurable fields not enabled for encryption in the example in FIG. 6 include URL 664, page 674 and user IP 694. In a different implementation, the list of sensitive fields available for customer data privacy protection via encryption can include different and additional fields.

Interactions by users with tens of thousands of cloud-based applications are monitored by network security system 155, which generates metadata from raw event data, with information gleaned from every cloud application transaction passing through the system. FIG. 7 shows exemplary metadata for a network event labeled upload activity 764 in a JSON-style representation. Example sensitive data in the metadata that needs to be protected includes source IP address 724 and user 754. The metadata file shown in FIG. 7 is not exhaustive of the event-related fields that can be captured in a metadata file, but rather highlights key fields. Additionally, event metadata from external sources can also be provided to network security system 155. Workflow examples are described next for building indexable database to protect the sensitive metadata information stored at rest and to retrieve the stored information.

Workflow

Figure 8:
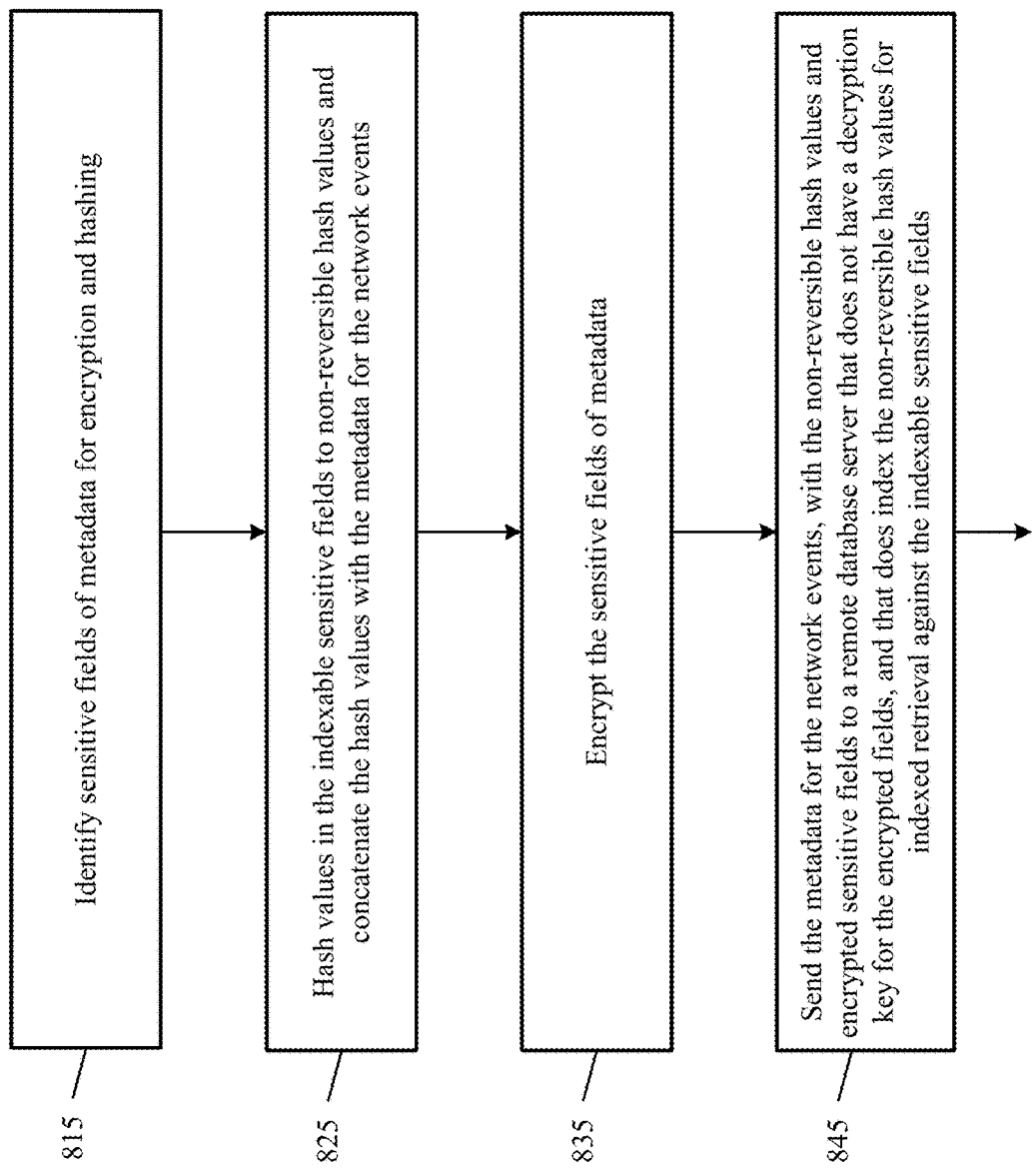
FIG. 8 depicts disclosed client data privacy protection workflow for securely storing sensitive data in the cloud, building indexable databases with sensitive information secured at rest, in accordance with an implementation of the technology disclosed.

FIG. 8 shows a representative method of building indexable databases with sensitive information secured at rest.

Flowchart 800 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 8. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features.

FIG. 8 begins with action 815, which includes identifying sensitive fields of data for encryption and hashing. In one case, the fields are pre-defined for an enterprise. In another case, a user interface lists potentially sensitive fields that can be configured by an administrator to be flagged as sensitive data fields. In other cases, additional mechanisms for identifying sensitive fields for encryption can be utilized, such as loading a batch file of sensitive fields.

Process 800 continues at action 825 which includes hashing values in the indexable sensitive fields to non-reversible hash values and concatenating the hash values with the metadata for the network events.

At action 835, sensitive data encryptor 266 encrypts the sensitive fields identified at action 815 as sensitive fields of metadata.

At action 845, forwarder 286 sends the log events, with the non-reversible hash values and encrypted sensitive fields to a remote database server that does not have a decryption key for the encrypted fields, and that does index the non-reversible hash values for indexed retrieval against the indexable sensitive fields.

Figure 9:
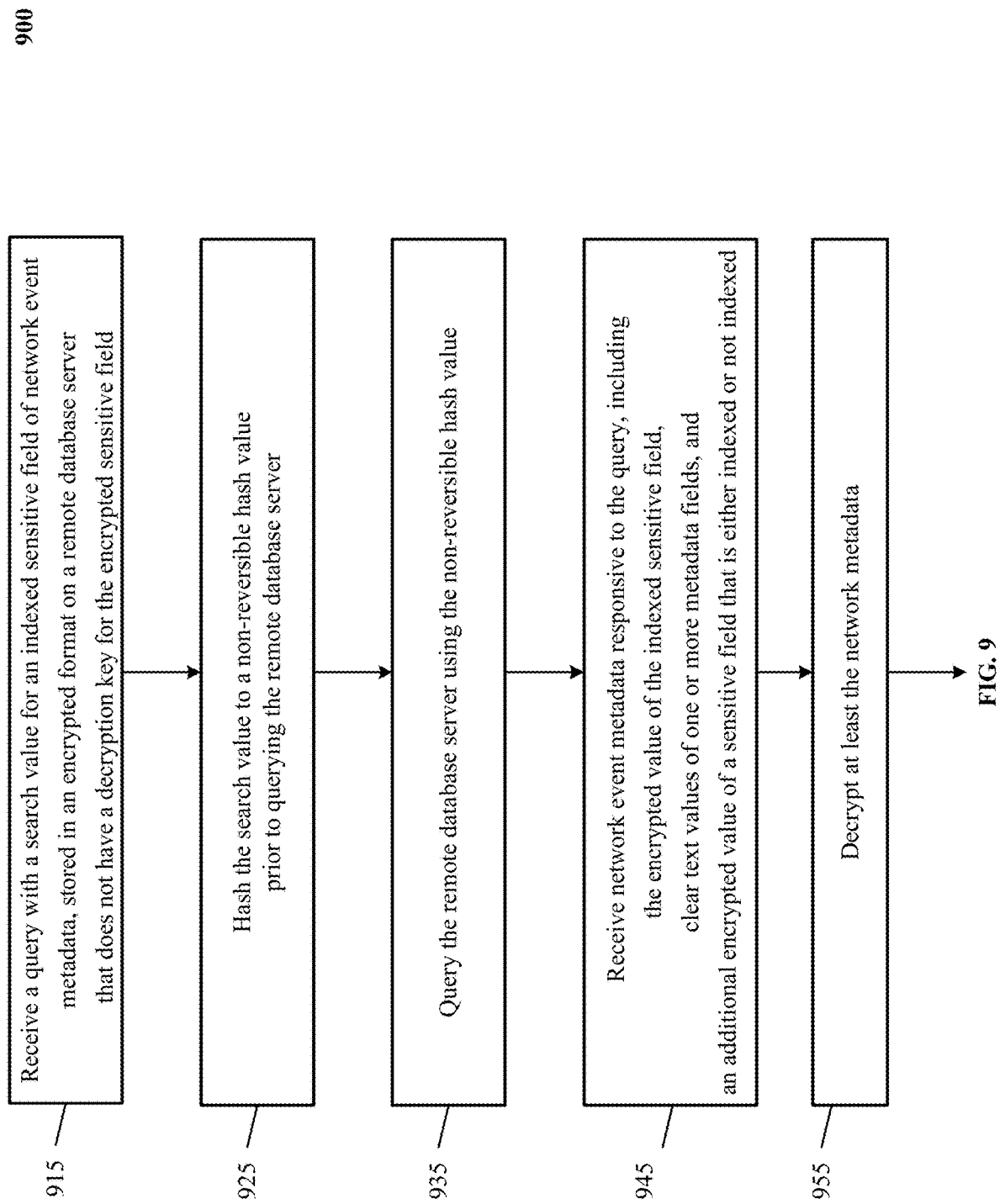
FIG. 9 illustrates a representative method of the disclosed technology for retrieving sensitive information that is secured at rest, in accordance with an implementation of the technology disclosed.

FIG. 9 shows a representative method of retrieving sensitive information that is secured at rest. Flowchart 900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 8. Multiple actions can be combined in some implementations. For convenience, this flowchart is described with reference to the system that carries out a method. The system is not necessarily part of the method.

FIG. 9 begins with action 915, with receiving a query with a search value for an indexed sensitive field of network event metadata, stored in an encrypted format on a remote database server that does not have a decryption key for the encrypted sensitive field.

Process 900 continues at action 925 with hashing the search value to a non-reversible hash value, prior to querying the remote database server.

Action 935 includes query engine 238 querying the remote database server using the non-reversible hash value.

At action 945 the process includes receiving network event metadata responsive to the query, including the encrypted value of the indexed sensitive field, clear text values of one or more metadata fields, and an additional encrypted value of a sensitive field that is either indexed or not indexed.

At action 955, decryption engine 344 is decrypting at least the indexed sensitive field of network event metadata received from the remote database server responsive to the querying at action 935.

Other implementations of the methods described in this section can include a non-transitory computer readable storage medium storing instructions executable by a processor to perform any of the methods described above. Yet other implementations of the methods described in this section can include a system including memory and one or more processors operable to execute instructions, stored in the memory, to perform any of the methods described above.

In some implementations, the gathered metadata is processed and/or normalized. In some instances, metadata includes structured data and functionality targets specific data constructs provided by the cloud services 118. Non-structured data, such as free text, can also be provided by, and targeted back to, the cloud services 118. Both structured and non-structured data are capable of being aggregated by the introspective analyzer 175. For instance, the assembled metadata is stored in a semi-structured data format like a JSON (JavaScript Option Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. These JSON objects are stored in a schema-less or NoSQL key-value metadata store 148 like Apache Cassandra™ 158, Google's BigTable™, HBase™ Voldemort™, CouchDB™, MongoDB™, Redis™, Riak™, Neo4j™, etc., which stores the parsed JSON objects using keyspaces that are equivalent to a database in SQL. Each keyspace is divided into column families that are similar to tables and comprise of rows and sets of columns.

In an implementation, introspective analyzer 175 includes a metadata parser (omitted to improve clarity) that analyzes incoming metadata and identifies keywords, events, user IDs, locations, demographics, file type, timestamps, and so forth within the data received. Parsing is the process of breaking up and analyzing a stream of text into keywords, or other meaningful elements called "targetable parameters". In one implementation, a list of targeting parameters becomes input for further processing such as parting or text mining, for instance, by a matching engine (not shown). Parsing extracts meaning from available metadata. In one implementation, tokenization operates as a first step of parsing to identify granular elements (e.g., tokens) within a stream of metadata, but parsing then goes on to use the context that the token is found in to determine the meaning and/or the kind of information being referenced. Because metadata analyzed by introspective analyzer 175 are not homogenous (e.g., there are many different sources in many different formats), certain implementations employ at least one metadata parser per cloud service, and in some cases more than one. In other implementations, introspective analyzer 175 uses monitor 184 to inspect the cloud services and assemble content metadata.

Computer System

Figure 10:
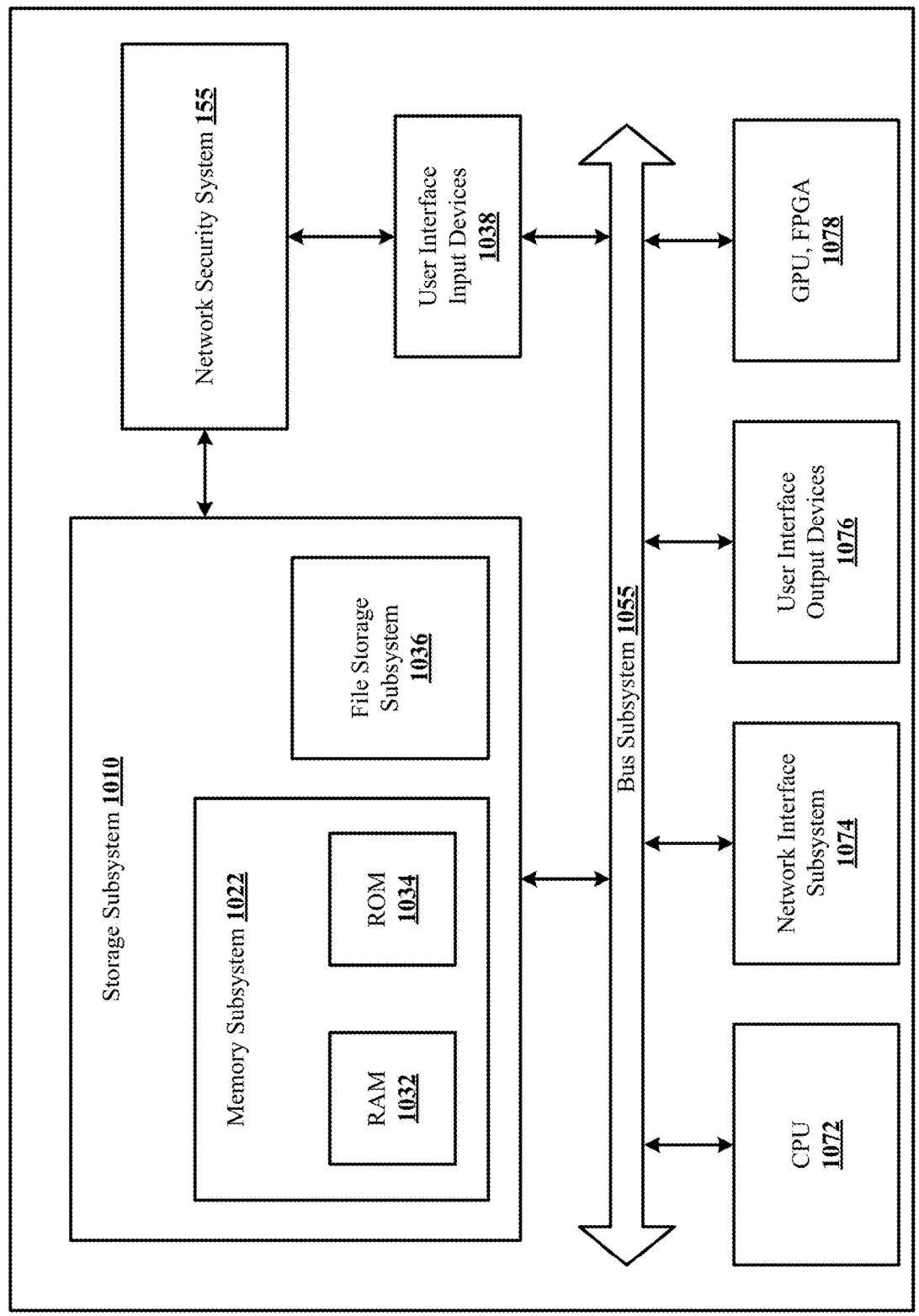
FIG. 10 is a simplified block diagram of a computer system that can be used for providing security for network delivered services, including building indexable databases with sensitive data secured at rest, in one implementation of the disclosed technology.

FIG. 10 is a simplified block diagram of a computer system 1000 that can be used for providing security for network delivered services, including building indexable databases with sensitive data secured at rest. Computer system 1000 includes at least one central processing unit (CPU) 1072 that communicates with a number of peripheral devices via bus subsystem 1055, and network security system 155 for providing network security services described herein. These peripheral devices can include a storage subsystem 1010 including, for example, memory devices and a file storage subsystem 1036, user interface input devices 1038, user interface output devices 1076, and a network interface subsystem 1074. The input and output devices allow user interaction with computer system 1000. Network interface subsystem 1074 provides an interface to outside networks, including an interface to corresponding interface devices in other computer systems.

In one implementation, network security system 155 of FIG. 1 is communicably linked to the storage subsystem 1010 and the user interface input devices 1038.

User interface input devices 1038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1000.

User interface output devices 1076 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1000 to the user or to another machine or computer system.

Storage subsystem 1010 stores programming and data constructs that provide the functionality of some or all of the modules and methods described herein. Subsystem 1078 can be graphics processing units (GPUs) or field-programmable gate arrays (FPGAs).

Memory subsystem 1022 used in the storage subsystem 1010 can include a number of memories including a main random access memory (RAM) 1032 for storage of instructions and data during program execution and a read only memory (ROM) 1034 in which fixed instructions are stored. A file storage subsystem 1036 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1036 in the storage subsystem 1010, or in other machines accessible by the processor.

Bus subsystem 1055 provides a mechanism for letting the various components and subsystems of computer system 1000 communicate with each other as intended. Although bus subsystem 1055 is shown schematically as a single bus, alternative implementations of the bus subsystem can use multiple busses.

Computer system 1000 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1000 depicted in FIG. 10 is intended only as a specific example for purposes of illustrating the preferred embodiments of the present invention. Many other configurations of computer system 1000 are possible having more or less components than the computer system depicted in FIG. 10.

Particular Implementations

Some particular implementations and features for building indexable databases with sensitive information secured at rest and retrieving sensitive information that is secured at rest are described in the following discussion.

In one disclosed implementation, is a method of building indexable databases with sensitive data secured at rest, includes identifying sensitive fields of metadata for network events for encryption and indexable sensitive fields, among the sensitive fields, for hashing The method also includes hashing at least partial values in the indexable sensitive fields to non-reversible hash values and concatenating the non-reversible hash values with the metadata for the network events and encrypting the sensitive fields of metadata. The disclosed method further includes sending the metadata for the network events, with the non-reversible hash values and the encrypted sensitive fields, to a remote database server that does not have a decryption key for the encrypted sensitive fields and that indexes the non-reversible hash values for indexed retrieval against the indexable sensitive fields.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

In one implementation, the disclosed method includes rotating a key used for the encryption occasionally or periodically, without changing a hashing function used for the hashing the indexable sensitive fields to the non-reversible hash values. This rotating can occur each time a set amount of data has been encrypted in one case. In another case, the rotating can occur regularly in time, such as once every forty-eight hours or once weekly.

In another disclosed implementation, the remote database server further indexes some non-sensitive data in the metadata for the network events.

In the disclosed implementation of the method, the remote database server is provided by a service provider distinct from an organization performing the hashing, the encrypting and the sending and the organization does not give the service provider the decryption key.

The disclosed method further includes performing the hashing, the encrypting and the sending on premises of an organization distinct from a service provider that provides the remote database server. The implementation of the method disclosed further includes performing the hashing, the encrypting and the sending within a virtual private network dedicated to an organization, wherein the organization is distinct from a service provider that provides the remote database server, and the organization does not give the service provider the decryption key.

Some implementations of the disclosed method use a symmetrical encryption function for the encrypting of the sensitive fields of metadata. Other disclosed implementations further include using a public key of an asymmetrical encryption function for the encrypting of the sensitive fields of metadata.

Implementations are also disclosed for a method of retrieving sensitive information that is secured at rest, which includes receiving a query with a search value for an indexed sensitive field of network event metadata that is stored in an encrypted format on a remote database server that does not have a decryption key for the encrypted sensitive field. The method also includes hashing at least part of the search value to a non-reversible hash value prior to querying the remote database server and querying the remote database server using the non-reversible hash value. The disclosed method further includes receiving network event metadata responsive to the query, including an encrypted value of the indexed sensitive field subject to the query, clear text values of one or more metadata fields, and an additional encrypted value of a sensitive field that is either indexed or not indexed. The method also includes decrypting at least the network metadata responsive to the query.

Some implementations of the disclosed method of retrieving sensitive information that is secured at rest include determining for each record of the network event metadata responsive to the query, a rotating key used to encrypt the record and the rotating key to be used to decrypt the record. In some cases, the query also includes an additional search value for network event metadata that is stored in an unencrypted format and using the additional search value in the querying of the remote database. For example, it may be desirable to obtain search results that show all activity for a specific twenty four hour period, so timestamps can be used in the query to achieve this result.

One disclosed implementation of the method includes processing at least the indexed sensitive field of network event metadata received from the remote database server responsive to the querying.

For one disclosed implementation of the method, the remote database server is provided by a service provider distinct from an organization performing the hashing, the querying, the receiving and the decrypting and the organization does not give the service provider the decryption key. The implementations can also include performing the hashing, the querying, the receiving and the decrypting on premises of an organization distinct from a service provider that provides the remote database server.

For some implementations of the disclosed method of retrieving sensitive information that is secured at rest include performing the hashing, the querying, the receiving and the decrypting within a virtual private network dedicated to an organization, wherein the organization is distinct from a service provider that provides the remote database server, and the organization does not give the service provider the decryption key.

Other implementations of the methods described in this section can include a tangible non-transitory computer readable storage media storing program instructions loaded into memory that, when executed on processors cause the processors to perform any of the methods described above. Yet another implementation of the methods described in this section can include a device including memory and one or more processors operable to execute computer instructions, stored in the memory, to perform any of the methods described above.

Any data structures and code described or referenced above are stored according to many implementations on a computer readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method of building indexable databases with sensitive data secured at rest, including:
   identifying sensitive fields of metadata for network events for encryption and identifying indexable sensitive fields, among the sensitive fields, for hashing;
   hashing at least partial values in the indexable sensitive fields to non-reversible hash values and concatenating the non-reversible hash values with the metadata for the network events;
   encrypting the sensitive fields of metadata; and
   sending the metadata for the network events, with the non-reversible hash values and the encrypted sensitive fields, to a remote database server that does not have access to a decryption key for the encrypted sensitive fields and causing the remote database server to index the non-reversible hash values for indexed retrieval of records including the indexable sensitive fields.

2. The method of claim 1, further including:
   rotating a key used for the encryption periodically, without changing a hashing function used for the hashing the indexable sensitive fields to the non-reversible hash values.

3. The method of claim 1, further including:
   rotating a key used for the encryption after an amount of data has been encrypted, without changing a hashing function used for the hashing the indexable sensitive fields to the non-reversible hash values.

4. The method of claim 1, further causing the remote database server to index some non-sensitive data in the metadata for the network events.

5. The method of claim 1, wherein the remote database server is provided by a service provider distinct from an organization performing the hashing, the encrypting and the sending and the organization does not give the service provider the decryption key.

6. The method of claim 1, further including performing the hashing, the encrypting and the sending on premises of an organization distinct from a service provider that provides the remote database server.

7. The method of claim 1, further including performing the hashing, the encrypting and the sending within a virtual private network dedicated to an organization, wherein the organization is distinct from a service provider that provides the remote database server, and the organization does not give the service provider the decryption key.

8. The method of claim 1, further including using a symmetrical encryption function for the encrypting of the sensitive fields of metadata.

9. The method of claim 1, further including using a public key of an asymmetrical encryption function for the encrypting of the sensitive fields of metadata.

10. A method of retrieving sensitive information that is secured at rest, including:
- receiving a query with a search value for an indexed sensitive field of network event metadata that is stored in an encrypted format on a remote database server that does not have access to a decryption key for the encrypted sensitive field;
- hashing at least part of the search value to a non-reversible hash value prior to querying the remote database server;
- querying the remote database server using the non-reversible hash value;
- receiving network event metadata responsive to the query, including an encrypted value of the indexed sensitive field subject to the query, clear text values of one or more metadata fields, and an additional encrypted value of a sensitive field that is either indexed or not indexed; and
- decrypting at least the network event metadata responsive to the query.

11. The method of claim 10, further including determining for each record of the network event metadata responsive to the query, a rotating key used to encrypt the record and the rotating key to be used to decrypt the record.

12. The method of claim 10, wherein the query further includes an additional search value for network event metadata that is stored in an unencrypted format and using the additional search value in the querying of the remote database.

13. The method of claim 10, further including processing at least the indexed sensitive field of network event metadata received from the remote database server responsive to the querying.

14. The method of claim 10, wherein the remote database server is provided by a service provider distinct from an organization performing the hashing, the querying, the receiving and the decrypting and the organization does not give the service provider the decryption key.

15. The method of claim 10, further including performing the hashing, the querying, the receiving and the decrypting on premises of an organization distinct from a service provider that provides the remote database server.

16. The method of claim 10, further including performing the hashing, the querying, the receiving and the decrypting within a virtual private network dedicated to an organization, wherein the organization is distinct from a service provider that provides the remote database server, and the organization does not give the service provider the decryption key.

17. A tangible non-transitory computer readable storage media, including program instructions loaded into memory that, when executed on processors, cause the processors to implement a process that includes:
- identifying sensitive fields of metadata for network events for encryption and identifying indexable sensitive fields, among the sensitive fields, for hashing;
- hashing at least partial values in the indexable sensitive fields to non-reversible hash values and concatenating the non-reversible hash values with the metadata for the network events;
- encrypting the sensitive fields of metadata; and
- sending the metadata for the network events, with the non-reversible hash values and the encrypted sensitive fields, to a remote database server that does not have access to a decryption key for the encrypted sensitive fields and causing the remote database server to index the non-reversible hash values for indexed retrieval against the indexable sensitive fields.

18. A device for building indexable databases with sensitive data secured at rest, the device comprising a processor and the tangible non-transitory computer readable storage media of claim 17.

19. A tangible non-transitory computer readable storage media, including program instructions loaded into memory that, when executed on processors, cause the processors to implement a process that includes:
- receiving a query with a search value for an indexed sensitive field of network event metadata that is stored in an encrypted format on a remote database server that does not have access to a decryption key for the encrypted sensitive field;
- hashing at least part of the search value to a non-reversible hash value prior to querying the remote database server;
- querying the remote database server using the non-reversible hash value;
- receiving network event metadata responsive to the query, including an encrypted value of the indexed sensitive field subject to the query, clear text values of one or more metadata fields, and an additional encrypted value of a sensitive field that is either indexed or not indexed; and
- decrypting at least the network event metadata responsive to the query.

20. A device for retrieving sensitive information that is secured at rest, the device comprising a processor, a memory coupled to the processor, and the tangible non-transitory computer readable storage media of claim 19.

* * * * *